US009980336B2

(12) United States Patent
Goda

(10) Patent No.: US 9,980,336 B2
(45) Date of Patent: May 22, 2018

(54) LIGHT RECEIVING DEVICE, LIGHT EMITTING DEVICE AND LIGHT RECEIVING/EMITTING DEVICE

(71) Applicant: ASAHI KASEI MICRODEVICES CORPORATION, Tokyo (JP)

(72) Inventor: Yuji Goda, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days. days.

(21) Appl. No.: 15/706,970

(22) Filed: Sep. 18, 2017

(65) Prior Publication Data

US 2018/0092181 A1   Mar. 29, 2018

(30) Foreign Application Priority Data

Sep. 29, 2016   (JP) .................................. 2016-191932

(51) Int. Cl.
   *H05B 33/08*   (2006.01)

(52) U.S. Cl.
   CPC ................................ *H05B 33/0854* (2013.01)

(58) Field of Classification Search
   CPC ............ H05B 33/0851; H05B 33/0854; H05B 33/0872; H05B 33/0884; H01S 5/086; H01S 5/0617; H01S 5/0683; H01S 5/06804; H01S 5/06837; G09G 320/041; G09G 320/045; G09G 3/3233; H04B 10/564; H04B 10/502; H04B 10/504
   See application file for complete search history.

(56) References Cited

U.S. PATENT DOCUMENTS

| 7,961,557 B2* | 6/2011 | Fujii | G04C 3/14 368/11 |
| 8,345,069 B2* | 1/2013 | Minami | G09G 3/3233 345/690 |
| 8,446,108 B2* | 5/2013 | Zhang | H05B 33/0851 315/117 |
| 2001/0017876 A1 | 8/2001 | Kner et al. | |

(Continued)

FOREIGN PATENT DOCUMENTS

| JP | S58-002711 A | 1/1983 |
| JP | H02-222184 A | 9/1990 |

(Continued)

*Primary Examiner* — Haissa Philogene
(74) *Attorney, Agent, or Firm* — Morgan, Lewis & Bockius LLP

(57) ABSTRACT

A light receiving device is equipped with a first light receiving element which outputs a first output signal corresponding to an amount of received light, a temperature information acquisition unit which acquires temperature information of the first light receiving element, a generation unit which generates compensating information of the first output signal, based on first output signals and temperature information when power is supplied to the first light receiving element in a plurality of power supply conditions and stores the same in a storage unit, and a compensation unit which compensates the first output signal, based on the temperature information and the compensating information when the first output signal is output.
Thus, even when temperature characteristics of an optical element are varied, the temperature characteristics are compensated highly accurately.

16 Claims, 6 Drawing Sheets

(56) References Cited

U.S. PATENT DOCUMENTS

| | | |
|---|---|---|
| 2002/0118424 A1 | 8/2002 | Miki et al. |
| 2002/0196595 A1 | 12/2002 | Ciancio |
| 2005/0007904 A1* | 1/2005 | Ishiyama ............. G11B 7/0956 369/44.32 |
| 2013/0249419 A1 | 9/2013 | Zhang et al. |

FOREIGN PATENT DOCUMENTS

| | | |
|---|---|---|
| JP | H03-084430 A | 4/1991 |
| JP | H09-015053 A | 1/1997 |
| JP | 2008-123767A A | 5/2008 |
| JP | 2013-004263 A | 1/2013 |
| JP | 2015-215961 A | 12/2015 |
| JP | 5842288 B2 | 1/2016 |

* cited by examiner

LIGHT RECEIVING DEVICE, LIGHT EMITTING DEVICE AND LIGHT RECEIVING/EMITTING DEVICE

BACKGROUND OF THE INVENTION

Field of the Invention

The present invention relates to a light receiving device, a light emitting device, and a light receiving/emitting device.

Description of the Related Art

A light receiving element such as a photodiode, a phototransistor, a thermopile or the like, a light emitting element such as an LED (Light Emitting Diode), a laser, a MEMS (Micro Electro Mechanical Systems) heater or the like, and an optical element such as a light receiving/emitting element in which these light receiving and emitting elements are combined, have heretofore been used as a sensor or a light source for a measuring device, or in an optical device such as a lighting application. On the other hand, when the temperature of the optical elements changes by an environment temperature or a peripheral heat source in many cases, these optical elements change in element characteristics i.e., theses optical elements have temperature characteristics.

In the case of the light receiving element, for example, the output of the light receiving element changes according to a change in the temperature of the light receiving element even though light with the same light amount is received. Further, in the case of the light emitting element, for example, the amount of light output according to a change in the temperature of the light emitting element changes even though the same power is applied.

These phenomena cause a problem that when the optical element is used in a measuring device, for example, a measurement result changes according to the temperature thereof. Further, when the optical element is used for lighting applications, for example, the phenomena cause problems such as a change in brightness of illumination according to its element temperature, the occurrence of luminosity unevenness due to an irregularity in temperature around the illumination, etc.

As measures against these problems, there has been disclosed in, for example, a Patent Literature 1, a method of compensating temperature dependency of brightness of illumination by controlling a driving method by an LED controller according to the die temperature of an LED. Further, there has been disclosed in a Patent Literature 2, a method of dividing a light source into a plurality blocks and correcting a driving amount of the light source in such a manner that the luminance of the light source coincides with target luminance, based on a detected value of an ambient temperature of the light source for each block, a detected value of the luminance of the light source, and temperature characteristics of the light source.

CITATION LIST

Patent Literatures

PTL 1: JP 5842288 B
PTL 2: JP 2013-4263 A

SUMMARY OF THE INVENTION

As illustrated in the Patent Literature 1, a means for observing the temperature and changing control according to a result of its observation is effective for compensating the influence of temperature characteristics of an optical element. It is however necessary to acquire the temperature characteristics of the optical element or an optical device in advance at a pre-shipment inspection or the like of a product, for example.

Specifically, for example, when the brightness of illumination of the LED is kept at a prescribed value without depending on a change in element temperature by controlling a current value input to the LED, it is necessary to acquire in advance the relationship between a current value and brightness at a given element temperature, i.e., compensation information for compensating temperature characteristics. Further, when the LED illumination is used, the element temperature is measured and the current value input to the LED is determined by referring to the compensation information acquired in advance, so that the brightness of the LED illumination can be kept at the prescribed value without depending on the change in the element temperature.

A problem however arises in that when the temperature characteristics of the optical element change due to aging deterioration or the like where the compensation information for compensating the temperature characteristics acquired in advance will continue to be used, the accuracy of compensation of the temperature characteristics is degraded.

The present invention has been made in view of such problems. An object of the present invention is to provide a light receiving device, a light emitting device, and a light receiving/emitting device capable of even when the temperature characteristics of an optical element change due to aging deterioration or the like, compensating the temperature characteristics highly accurately.

In order to achieve the above object, there is provided a light receiving device according to one aspect of the present invention, which is equipped with a first light receiving element which outputs a first output signal corresponding to an amount of received light, a temperature information acquisition unit which acquires temperature information of the first light receiving element, a storage unit which stores compensation information used for compensation of the first output signal, a control unit which supplies power to the first light receiving element to thereby change the first light receiving element to a plurality of temperature states, a generation unit which generates the compensation information, based on a plurality of the first output signals and the temperature information in the plurality of temperature states, and a compensation unit which compensates the first output signal, based on the temperature information and the compensation information.

Also, there is provided a light emitting device according to another aspect of the present invention, which is equipped with a first light emitting element which outputs light having an amount corresponding to supplied power, a temperature information acquisition unit which acquires temperature information of the first light emitting element, a storage unit which stores compensation information used for compensation of a power supply condition of the first light emitting element, a control unit which supplies power to the first light emitting element to change the first light emitting element to a plurality of temperature states, a generation unit which generates the compensation information, based on a plurality of outputs of the first light emitting element and the temperature information in the plurality of temperature states, and a compensation unit which compensates the power supply condition, based on the temperature information and the compensation information.

Further, there is provided a light receiving/emitting device according to still another aspect of the present invention, which is equipped with a first light emitting element which outputs light having an amount corresponding to supplied power, a first light receiving element which receives at least part of the light output from the first light emitting element and outputs a first output signal corresponding to an amount of the received light, a temperature information acquisition unit which acquires temperature information of the first light emitting element, a first storage unit which stores first compensation information used for compensation of the first output signal, a control unit which supplies power to the first light emitting element to change the first light emitting element to a plurality of temperature states, a first generation unit which generates the first compensation information, based on a plurality of the first output signals and the temperature information in the plurality of temperature states, and a first compensation unit which compensates the first output signal, based on the temperature information and the first compensation information.

Further, there is provided a compensating method of a light receiving device according to a further aspect of the present invention, which includes the steps of supplying power to a first light receiving element outputting a first output signal corresponding to an amount of received light in such a manner that a temperature state of the first light receiving element is changed to a plurality of temperature states, generating compensation information used for compensation of the first output signal, based on a plurality of the first output signals and temperature information of the first light receiving element when the first light receiving element is in the plurality of temperature states, and storing the same in a storage unit, and compensating the first output signal, based on the temperature information of the first light receiving element and the compensation information stored in the storage unit.

Also, there is provided a compensating method of a light emitting device according to a still further aspect of the present invention, which includes the steps of supplying power to a first light emitting element outputting light having an amount corresponding to supplied power in such a manner that a temperature state of the first light emitting element is changed to a plurality of temperature states, generating compensation information used for compensation of a power supply condition of the first light emitting element, based on a plurality of outputs of the first light emitting element and temperature information of the first light emitting element when the first light emitting element is in the plurality of temperature states, and storing the same in a storage unit, and compensating the power supply condition of the first light emitting element, based on the temperature information of the first light emitting element and the compensation information stored in the storage unit.

Furthermore, there is provided a compensating method of a light receiving/emitting device according to a yet further aspect of the present invention, having a first light emitting element which outputs light having an amount corresponding to supplied power, and a first light receiving element which receives at least part of the light output from the first light emitting element and outputs a first output signal corresponding to an amount of the received light, the method including the steps of supplying power to the first light emitting element in such a manner that a temperature state of the first light emitting element is changed to a plurality of temperature states, generating first compensation information used for compensation of the first output signal, based on a plurality of the first output signals of the first light receiving element and temperature information of the first light emitting element when the first light emitting element is in the plurality of temperature states, and storing the same in a storage unit, and compensating the first output signal, based on the temperature information of the first light emitting element and the first compensation information stored in the storage unit.

According to one aspect of the present invention, even when the temperature characteristics of an optical element are varied due to aging deterioration or the like, the temperature characteristics can be compensated with high accuracy by acquiring the temperature characteristics of the latest optical element under its use environment.

DESCRIPTION OF THE PREFERRED EMBODIMENTS

Figure 1:
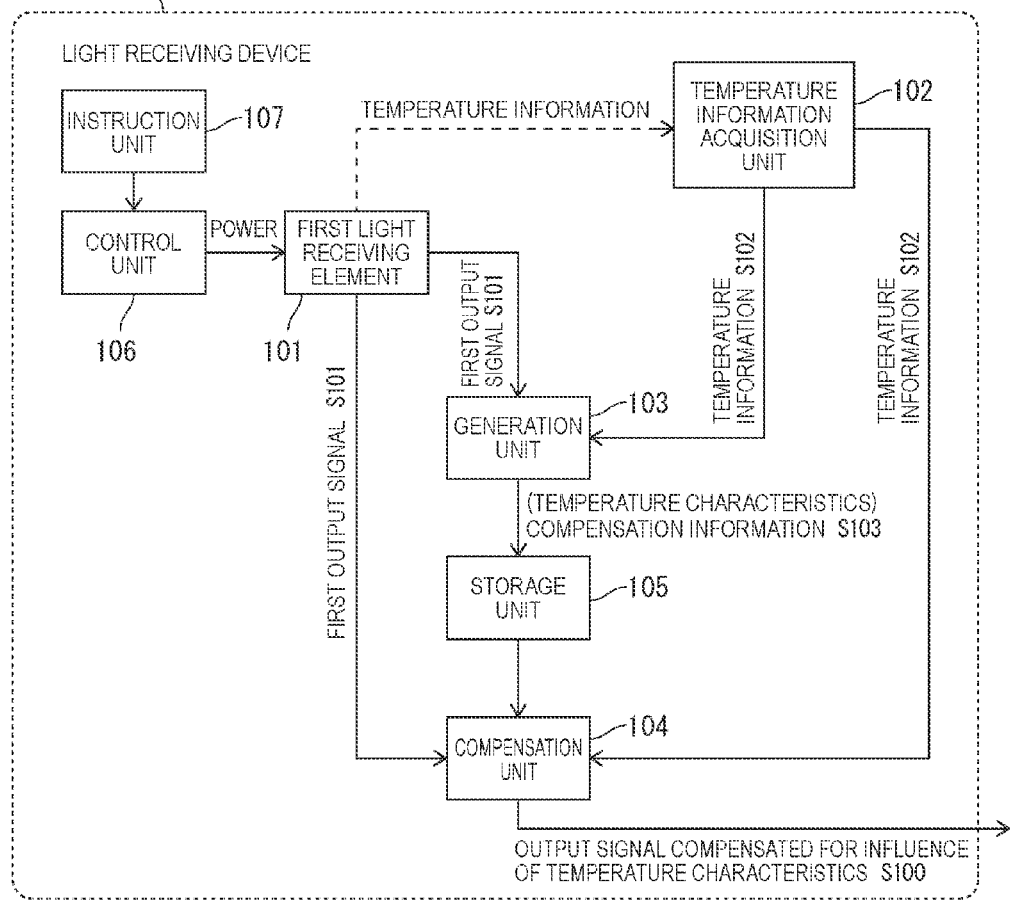
FIG. 1 is a schematic configuration diagram illustrating one example of a light receiving device according to a first embodiment of the present invention.

In the following detailed description, many particular specific configurations have been described to provide a thorough understanding of the embodiments of the present invention. It will however be apparent that other embodiments can be implemented without limitation to such particular specific configurations. Further, the following embodiments are not intended to limit the invention according to claims and include all of combinations of characteristic configurations that have been described in the embodiments.

One embodiment of the present invention will hereinafter be described with reference to the accompanying drawings. In the description of the following drawings, the same components are denoted by the same reference numerals.

A first embodiment of the present invention will first be described.

FIG. 1 is a schematic configuration diagram illustrating one example of a light receiving device according to the first embodiment of the present invention.

<Light Receiving Device>

A light receiving device according to one embodiment of the present invention is equipped with a first light receiving element which outputs a first output signal corresponding to an amount of received light, a temperature information acquisition unit which acquires temperature information of the first light receiving element, a storage unit which stores compensation information used for compensation of the first output signal a control unit which supplies power to the first light receiving element to thereby change the first light receiving element to a plurality of temperature states, a generation unit which generates the compensation information, based on a plurality of the first output signals and the temperature information in the plurality of temperature states, and a compensation unit which compensates the first output signal, based on the temperature information and the compensation information.

The compensation information mentioned here includes a table representing the correspondence of the temperature information and a rate of change in the first output signal, or a coefficient of a function for calculating the rate of change in the first output signal as an output with the temperature information as an input, a coefficient of a function for calculating the first output signal compensated for the influence of temperature characteristics with the temperature information and the first output signals as inputs, etc.

According to the light receiving device according to the one embodiment of the present invention, it is possible to acquire the temperature characteristics of the latest optical element under a use environment. Using this enables compensation for the influence of the temperature characteristics with high accuracy even when the temperature characteristics of the optical element are varied due to aging deterioration or the like. Further, since the plurality of temperature states can be generated by supplying power to the first light receiving element, it is possible to generate compensation information of the output of the first light receiving element without the need for a large-scaled facility like a heat bath such as a thermostatic chamber.

A light receiving device 100 according to the first embodiment of the present invention is equipped, as illustrated in FIG. 1, with a first light receiving element 101, a temperature information acquisition unit 102, a generation unit 103, a compensation unit 104, a storage unit 105, a control unit 106, and an instruction unit 107.

The first light receiving element 101 is capable of generating heat by supply of power from the control unit 106. Further, the first light receiving element 101 outputs a first output signal S101 being its output signal to the generation unit 103 and the compensation unit 104.

The temperature information acquisition unit 102 acquires temperature information of the first light receiving element 101 and outputs the acquired temperature information S102 to the generation unit 103 and the compensation unit 104. The generation unit 103 generates compensation information S103 for compensating temperature characteristics when a generation signal for instructing the generation of the compensation information is input from the instruction unit 107, and stores the generated compensation information S103 in the storage unit 105.

The compensation unit 104 compensates the first output signal S101 input from the first light receiving element 101, based on the temperature information S102 output from the temperature information acquisition unit 102 and the compensation information S103 stored in the storage unit 105, and outputs an output signal compensated for the influence of the temperature characteristics, i.e., an output signal S100 corresponding to an amount of received light.

When the generation signal for instructing the generation of the compensation information is input from the instruction unit 107, the control unit 106 supplies power to the first light receiving element 101 to change the first light receiving element 101 to a plurality of temperature states.

(First Light Receiving Element)

When the first light receiving element 101 receives therein light having a wavelength to be indicative of sensitivity by the light receiving device 100, the first light receiving element 101 is capable of electrically outputting a first output signal S101 corresponding to the amount of received light. Further, the first light receiving element 101 is not particularly limited as far as it is a light receiving element which generates heat by being supplied with power.

For example, a quantum type optical sensor such as a photodiode, a phototransistor corresponding to the wavelength to be indicative of sensitivity by the light receiving device 100 is suitable as the first light receiving element 101. Further, for example, particularly when a light receiving device which indicates its sensitivity with infrared rays is configured, a thermal-type infrared-ray sensor such as a Pyroelectric sensor, a Thermopile, a Bolometer or the like is also suitable as the first light receiving element 101.

Also, the first light receiving element 101 may be equipped with a circuit amplifying outputs of various sensors such as a photodiode, etc., a current-voltage conversion circuit, a resistance measurement circuit, etc. The first light receiving element 101 may output a current value, a voltage value or a resistance value as the first output signal S101.

Further, the first light receiving element 101 may have an analog/digital conversion circuit and output the first output signal S101 as digital data.

Since the electrically-connectable various sensors such as the photodiode, etc. as the first light receiving element 101 have electrical resistances, heat is generated by supplying power. However, in cases such as where it is not desirable to cause the sensor itself to generate heat from the viewpoint of its lifetime, etc. or where it is not possible to ensure a required applied voltage or supply current due to the restriction of a power supply circuit, etc., a resistor having a suitable resistance value may be provided in the vicinity of the sensor, and the resistor may be caused to generate heat by supplying power to the resistor.

(Temperature Information Acquisition Unit)

The temperature information acquisition unit 102 is not particularly limited as far as it is capable of acquiring temperature information of the first light receiving element 101 and outputting the acquired temperature information to the generation unit 103 and the compensation unit 104.

Since the temperature information of the first light receiving element 101 acquired by the temperature information acquisition unit 102 is used for acquisition of temperature characteristics as the compensation information of the first light receiving element 101 and compensation of temperature characteristics of the first output signal S101, it is desirable that the temperature information of the first light receiving element 101 is acquired with satisfactory accuracy.

The resistance value of the first light receiving element 101 may be used as the temperature information of the first light receiving element 101. When the electrically connectable light receiving element has the electrical resistance inclusive of the above-described quantum type optical sensor and thermal-type infrared-ray sensor and is of the quantum type optical sensor, for example, the resistance value thereof changes due to a change in carrier density according to the temperature of the element or a change in the state of an energy band, etc. Further, regardless of the light receiving element being the quantum type optical sensor or not, the resistance value changes even by the fact that the element is thermally expanded or contracted according to the temperature of the element. That is, the resistance value of the first light receiving element 101 has a direct correlation with the temperature of the first light receiving element 101. Therefore, the acquisition of the temperature characteristics as the compensation information of the first light receiving element 101, and the compensation for the temperature characteristics of the first output signal S101 can be carried out with satisfactory accuracy by using the resistance value of the first light receiving element 101 as the temperature information of the first light receiving element 101. Thus, it is preferable to use the resistance value of the first light receiving element 101 as the temperature information of the first light receiving element 101 from the viewpoint that the temperature information of the first light receiving element 101 is acquired with satisfactory accuracy.

Incidentally, as the resistance value of the first light receiving element 101, there may be used a potential difference generated in the first light receiving element 101 when a test current is input to the first light receiving element 101, or a value of a current which flows through the first light receiving element 101 when a test voltage is applied to the first light receiving element 101.

Further, a thermistor may be disposed in the vicinity of the first light receiving element 101, e.g. on the same substrate as the first light receiving element 101. The resistance value of the thermistor may be used as the temperature information of the first light receiving element 101. In this case, since the first light receiving element 101 and the thermistor are disposed on the same substrate, the temperature of the first light receiving element 101 and the temperature of the thermistor are considered to be approximately equal to each other. That is, the resistance value of the thermistor has an indirect correlation with the temperature of the first light receiving element 101. Therefore, the use of the resistance value of the thermistor as the temperature information of the first light receiving element 101 enables the acquisition of the temperature characteristics as the compensation information of the first light receiving element 101 and the compensation for the temperature characteristics of the first output signal to be carried out with satisfactory accuracy.

Thus, it is preferable to use the resistance value of the thermistor formed on the same substrate as the first light receiving element 101 as the temperature information of the first light receiving element 101 from the viewpoint that the temperature information of the first light receiving element 101 itself is acquired with satisfactory accuracy. Incidentally, as the resistance value of the thermistor, the potential difference generated in the thermistor when the test current is input to the thermistor, or the value of the current flowing through the thermistor when the test voltage is applied to the thermistor may be used.

The temperature information acquisition unit 102 is preferably, for example, a resistance measurement circuit. The resistance measurement circuit may calculate, for example, a resistance value, based on the potential difference generated in the resistance measuring object when the test current is input to the resistance measuring object, or the current flowing through the resistance measuring object when the test voltage is applied to the resistance measuring object.

Also, the temperature information acquisition unit 102 may have an analog/digital conversion circuit and output temperature information as digital data.

Further, the temperature information acquisition unit 102 may have a storage area, and store the temperature information of the first light receiving element 101 in the storage area, read the temperature information from the storage area according to requests from the generation unit 103 and the compensation unit 104, and output the read temperature information therefrom.

Furthermore, the temperature information acquisition unit 102 may be incorporated in another component such as the first light receiving element 101 or the like in the light receiving device 100.

(Generation unit)

The generation unit 103 is not particularly limited as far as being capable of generating compensation information from the relationship between the first output signal S101 output from the first light receiving element 101 and the temperature information S102 output from the temperature information acquisition unit 102. The generation unit 103 generates compensation information and stores the generated compensation information S103 in the storage unit 105. Further, when compensation information is newly generated, the generation unit 103 updates the compensation information generated before being stored in the storage unit 105 with the newly-generated compensation information and stores the same therein.

The generation unit 103 is preferably, for example, an analog IC (Integrated Circuit), a digital IC, and a processor such as a CPU (Central Processing Unit), a microcontroller or the like.

Further, the generation unit 103 may be incorporated in another component such as the compensation unit 104 in the light receiving device 100.

(Compensation Unit)

The compensation unit 104 is not particularly limited as far as being capable of compensating the first output signal S101 output from the first light receiving element 101, based on the temperature information S102 input from the temperature information acquisition unit 102 when the first output signal S101 is input from the first light receiving element 101, and the compensation information S103 read from the storage unit 105 and outputting the output signal compensated for the influence of the temperature characteristics, i.e., the output signal S100 of the light receiving device 100.

The compensation unit 104 is preferably, for example, an analog IC, a digital IC, and a processor such as a CPU, a microcontroller or the like.

Also, the compensation unit 104 may be incorporated in another component such as the generation unit 103 in the light receiving device 100.

Further, the compensation unit 104 may output the output signal S100 compensated for the influence of the temperature characteristics as an analog value such as a voltage value, a current value or the like, or may output the same as a digital value through a communication port or a bus.

(Storage Unit)

The storage unit 105 is not particularly limited as far as being capable of storing the compensation information S103 of the first output signal S101 generated in the generation unit 103. The storage unit 105 may be incorporated in the generation unit 103.

(Control Unit)

The control unit 106 is not particularly limited as far as being capable of changing the temperature state of the first light receiving element 101 by supplying power to the first light receiving element 101.

(Instruction Unit)

The instruction unit 107 is not particularly limited as far as being capable of outputting a generation signal for instructing the generation of the compensation information to the control unit 106. The instruction unit 107 outputs the generation signal to the control unit 106 by, for example, an instruction from a user to the instruction unit 107 to output the generation signal, or with an arbitrary timing such as periodically.

(Method of Compensating Influence of Temperature Characteristics)

A method of compensation (hereinafter may be called "temperature characteristics compensation") for the influence of the temperature characteristics, which is performed by the compensation unit 104 will be described using FIG. 2.

Figure 2:
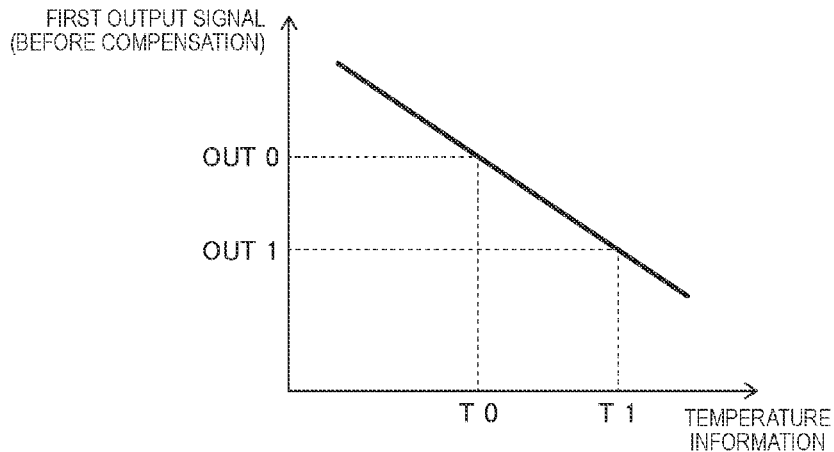
FIG. 2 is a conceptual diagram illustrating temperature characteristics of a first output signal as an output of a first light receiving element 101.

FIG. 2 is a conceptual diagram illustrating the temperature characteristics of the first output signal S101 being the output of the first light receiving element 101, and illustrates the relationship between the temperature information of the first light receiving element 101 and the first output signal S101 when the first light receiving element 101 receives a certain constant amount of light therein. In FIG. 2, the horizontal axis is the element temperature of the first light receiving element 101 or temperature information indicative of a value equivalent to the temperature. The vertical axis is the first output signal S101.

As illustrated in FIG. 2, it is generally known that there is a tendency that when the quantum type optical sensor or the thermal-type infrared-ray sensor or the like is used as the first light receiving element 101, the output of the light receiving element is reduced when the temperature of the light receiving element is raised.

As the method of compensation for the temperature characteristics, there is mentioned, for example, a method of defining a reference temperature of the first light receiving element 101 and converting the first output signal S101 at a temperature other than the reference temperature to a value equivalent to the first output signal at the reference temperature.

Assume that as illustrated in FIG. 2, for example, with respect to a reference temperature information value T0 corresponding to the reference temperature of the first light receiving element 101, an acquired temperature information value is T1, and OUT1 is obtained as the first output signal S101. In this case, such temperature characteristics as illustrated in FIG. 2 are used as compensation information, and the actually-acquired first output signal S101=OUT1 is converted to a value OUT0 equivalent to the first output signal at the reference temperature information value T0, thereby making it possible to obtain an output signal S100 (=OUT0) subjected to temperature compensation.

More specifically, for example, assume that from compensation information, the first output signal S101=OUT1 at the time that the first light receiving element 101 receives a certain amount of light therein when the temperature information value is T1 is read as becoming a value of 60% of the first output signal S101=OUT0 at the time that the first light receiving element 101 receives the same amount of light therein when the temperature information value is of the reference temperature information value T0. In this case, a value obtained by multiplying the first output signal S101=OUT1 obtained when the temperature information value is T1, by 5/3 (inverse number of 60%) may be output as the first output signal S101 after compensation for the temperature characteristics, i.e., the output signal S100 corresponding to the amount of received light.

By doing so, the light receiving device 100 is capable of outputting the output signal S100 compensated for the influence of the temperature characteristics.

(Acquisition of Compensation Information)

A method of acquiring the compensation information referred to when temperature characteristic compensation is performed, i.e., the temperature characteristics of the first output signal S101 being the output of the first light receiving element 101 will be described using FIG. 3.

When acquiring the compensation information, a change in the temperature of the first light receiving element 101, which is generated by supplying power to the first light receiving element 101 and thereby causing the first light receiving element 101 to generate heat is used.

That is, the temperature information of the first light receiving element 101 and the first output signal S101 are acquired when the temperature of the first light receiving element 101 is raised by the supply of the power, whereby the relationship between the temperature information of the first light receiving element 101 and the first output signal in a state in which the temperature of the first light receiving element 101 is raised more than an environment temperature can be acquired.

Figure 3:
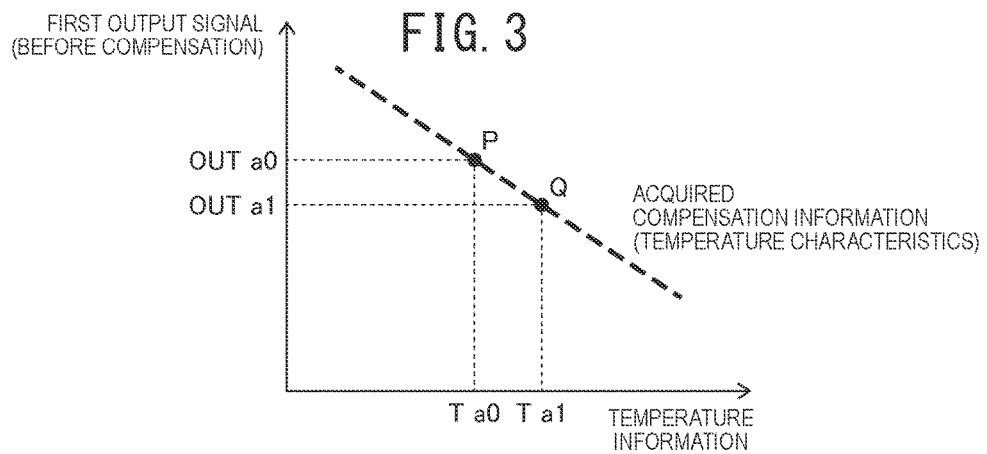
FIG. 3 is a conceptual diagram for describing a method of acquiring compensation information of the first output signal.

As illustrated in FIG. 3, for example, when a reference temperature information value Ta0 and a first output signal S101=OUTa0 at that time are obtained in a reference temperature environment, a point P in FIG. 3 is obtained. Further, when a temperature information value Ta1 and a first output signal S101=OUTa1 at that time are obtained by acquiring the temperature information of the first light receiving element 101 and the first output signal S101 after power is supplied to the first light receiving element 101 and thereby a rise in the temperature of the first light receiving element 101 occurs, a point Q in FIG. 3 is obtained. At this time, a straight line passing through the points P and Q can be used, as compensation information, for compensation of temperature characteristics of the first output signal S101 of the first light receiving element 101 at the subsequent compensation unit 104. Although only the two points P and Q are acquired as actual measurement values in the present example, actual measurement values at more points may be used. In that case, a curve of temperature characteristics being compensation information may be acquired as an approximate expression of an arbitrary equation by a least-squares method or the like using actual measurement points.

The acquisition of the relationship between the temperature information of the first light receiving element 101 and the first output signal S101 may be carried out plural times according to accuracy in temperature characteristics compensation to be determined, i.e., accuracy of compensation information to be acquired.

It is more desirable that since the first light receiving element 101 can actually measure only temperature characteristic in a state of a higher temperature than the environment temperature, the acquisition of the compensation information is performed on a temperature range desired to perform the temperature characteristics compensation under a lower-temperature environment.

Further, the acquisition of the compensation information may be used together with the related art. That is, information for compensating temperature characteristics at temperatures among a plurality of environment temperatures actually controlled by the heat bath may be interpolated by performing the acquisition of such compensation information while changing the environment temperature by using the heat bath such as the thermostatic chamber, for example.

The acquisition of the compensation information may be performed at the time of a pre-shipment inspection of the light receiving device 100.

Further, the acquisition of the compensation information may be performed in the middle of the light receiving device 100 being used. In this case, even though the temperature characteristics of the first light receiving element 101 are varied with its continuous use due to some sort of causes, compensation information can be newly acquired and updated to thereby cope with a change in the temperature characteristics of the first light receiving element 101. In this case, however, there is a necessity that in the middle of acquiring the compensation information, a change in the amount of light received by the first light receiving element 101 falls within a range sufficiently smaller than light reception sensitivity necessary for the light receiving device 100.

In order to avoid this restriction, a light emitting element (hereinafter called compensating light emitting element) for acquisition of compensation information, which outputs light having a light amount corresponding to power or current supplied thereto and a voltage applied thereto may be provided separately. While the compensation information is being acquired after power is supplied to the first light receiving element 101 under a plurality of power supply conditions, the compensating light emitting element may be driven under a prescribed drive condition to cause the first light receiving element 101 to receive even light output from the compensating light emitting element. This enables the change in the amount of light received by the first light receiving element 101 to fall within the range sufficiently smaller than the light reception sensitivity necessary for the light receiving device 100 while the compensation information is being acquired. Incidentally, the compensating light emitting element is not particularly limited as far as the first light receiving element 101 is capable of outputting light indicative of sensitivity. The compensating light emitting element is preferably, for example, a light emitting diode, an incandescent lightbulb or the like.

Also, likewise, in order to avoid this restriction, there may be further used a compensating light receiving element as a light receiving element for acquisition of compensation information, which is similar to the first light receiving element 101 and outputs a second output signal corresponding to an amount of received light. At this time, there may be done such as determining whether the amount of change in the second output signal is less than or equal to a threshold value set in advance while the compensation information is being acquired, to thereby confirm that the change in the second output signal falls within a range sufficiently smaller than light reception sensitivity required for the light receiving device 100, discarding the acquired compensation information where the change falls outside an allowable range, and using the acquired compensation information subsequently where the change falls within the allowable range. Doing so makes it possible to avoid that incorrect compensation information is acquired.

Further, the temperature information of the first light receiving element 101 and the first output signal S101 when the temperature of the first light receiving element 101 is raised by the supply of power may be acquired while the power supply is being performed, or may be acquired after the power supply is completed. However, when they are acquired after the power supply is completed, it is necessary to acquire the temperature information of the first light receiving element 101 and the first output signal S101 at that time before the temperature raised by the power supply is lowered to the environment temperature after the completion of the power supply.

Furthermore, the first output signal S101 may be acquired over many points in a process in which the temperature of the first light receiving element 101 is increased by the power supply, whereby first output signals S101 at the time that the first light receiving element 101 is placed in a plurality of temperature states may be acquired.

Besides, in order to acquire more highly accurate compensation information, when the temperature information of the first light receiving element 101 after the rise in the temperature by the supply of power and the first output signal S101 at that time are acquired over many points, the temperature information of the first light receiving element 101 and the first output signal S101 at that time may be acquired plural times during the time until the temperature raised by the power supply is lowered to the environment temperature after the completion of the power supply.

Thus, since the light receiving device 100 according to the first embodiment of the present invention is integrally equipped with the generation unit 103 therein, the temperature characteristics of the latest optical element can be acquired under the use environment or the like by operating the generation unit 103. Even when the temperature characteristics of the optical element are varied due to the aging deterioration or the like, the temperature characteristics can be compensated highly accurately.

A second embodiment of the present invention will next be described.

Figure 4:
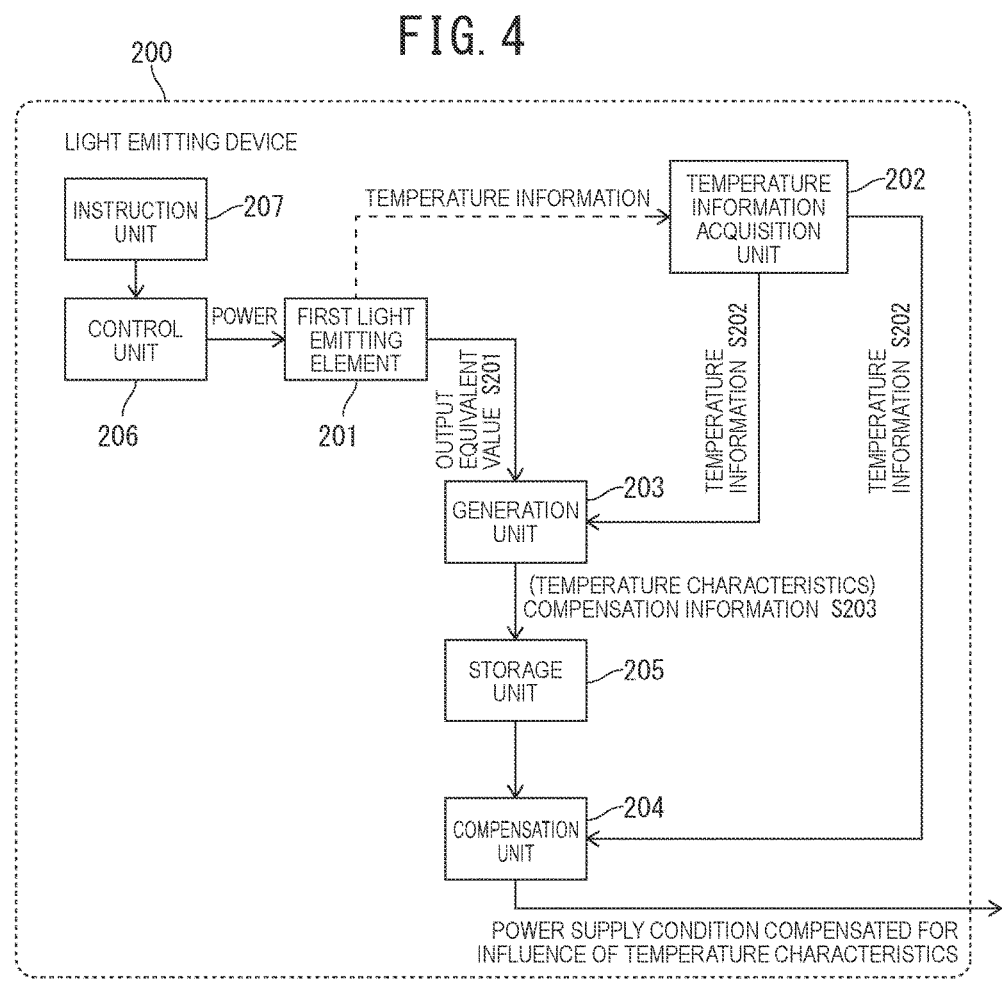
FIG. 4 is a schematic configuration diagram illustrating one example of a light emitting device according to a second embodiment of the present invention.

FIG. 4 is a schematic configuration diagram illustrating one example of a light emitting device according to the second embodiment of the present invention.

<Light Emitting Device>

A light emitting device according to one embodiment of the present invention is equipped with a first light emitting element which outputs light having an amount corresponding to supplied power, a temperature information acquisition unit which acquires temperature information of the first light emitting element, a storage unit which stores compensation information used for compensation of a power supply condition of the first light emitting element, a control unit which supplies power to the first light emitting element to change the first light emitting element to a plurality of temperature states, a generation unit which generates the compensation information, based on a plurality of outputs of the first light emitting element and the temperature information in the plural temperature states, and a compensation unit which compensates for the power supply condition, based on the temperature information and the compensation information.

The compensation information mentioned here includes a table representing the correspondence of temperature information of the first light emitting element and a rate of change in output signal of the first light emitting element, i.e., an output equivalent value S201 of the first light emitting element to be described later, or a table representing the correspondence of the temperature information of the first light emitting element and a power supply condition for outputting the prescribed same light, or a coefficient of a function for calculating the rate of change in the output equivalent value of the first light emitting element as an output with the temperature information as an input, or a coefficient of a function for calculating a power supply condition for outputting the prescribed same light as an output with the temperature information as an input, etc.

According to the light emitting device according to the one embodiment of the present invention, it is possible to acquire temperature characteristics of the latest optical element under a use environment. Using this enables compensation for the influence of the temperature characteristics with high accuracy even when the temperature characteristics of an optical element are varied due to aging deterioration or the like. Further, since a plurality of temperature states can be generated by supplying power to the first light emitting element, it is possible to generate the compensation information of the power supply condition of the first light emitting element without the need for a large-scaled facility like a heat bath such as a thermostatic chamber.

A light emitting device 200 according to the second embodiment of the present invention is equipped, as illustrated in FIG. 4, with a first light emitting element 201, a temperature information acquisition unit 202, a generation unit 203, a compensation unit 204, a storage unit 205, a control unit 206, and an instruction unit 207.

The first light emitting element 201 is operated in response to the supply of power from the control unit 206. The output of the first light emitting element 201, i.e., light output from the first light emitting element 201 is received by a light receiving element provided outside the light emitting device 200, and a signal corresponding to an amount of the received light is output to the generation unit 203 as the output equivalent value S201 of the first light emitting element 201.

The temperature information acquisition unit 202 acquires temperature information of the first light emitting element 201 and outputs the acquired temperature information S202 to the generation unit 203 and the compensation unit 204. The generation unit 203 generates compensation information for compensating temperature characteristics, based on the output equivalent value S201 of the first light emitting element 201 and the temperature information S202 at the time that the output equivalent value S201 is detected, when a generation signal for instructing the generation of the compensation information is input from the instruction unit 207, and stores the generated compensation information S203 in the storage unit 205. The compensation unit 204 compensates a power supply condition for driving the first light emitting element 201, based on the temperature information output from the temperature information acquisition unit 202 and the compensation information stored in the storage unit 205, and outputs the compensated power supply condition to the control unit 206.

The control unit 206 performs the supply of power to the first light emitting element 201 using the power supply condition compensated by the compensation unit 204. When the generation signal for instructing the generation of the compensation information is input from the instruction unit 207, the control unit 206 changes the power supply condition to change the first light emitting element 201 to a plurality of temperature states.

(First Light Emitting Element)

The first light emitting element 201 is not particularly limited as far as being capable of outputting light having a wavelength to be output by the light emitting device 200, which has an amount of light corresponding to supplied power. The first light emitting element 201 is preferably, for example, an LED (Light Emitting Diode) corresponding to a wavelength to be output by the light emitting device 200, a MEMS heater, an incandescent lightbulb or the like. Further, the supply of power to the first light emitting element 201 may be performed by the input of a current or the application of a voltage. At this time, a current source or a voltage source may be used.

Further, the first light emitting element 201 may have a drive circuit for performing the supply of power to the first light emitting element 201 and driving various light sources such as an LED as the first light emitting element 201.

Since the electrically-connectable various light sources have electrical resistances, heat is generated by supplying power. However, in cases such as where it is not desirable to cause the light source itself to generate heat from the viewpoint of its lifetime, etc. or where it is not possible to ensure a required applied voltage or supply current due to the restriction of a power supply circuit, etc., a resistor having a suitable resistance value may be provided in the vicinity of the light source, and the resistor may be caused to generate heat by supplying power to the resistor.

(Temperature Information Acquisition Unit)

The temperature information acquisition unit 202 is not particularly limited as far as being capable of acquiring temperature information of the first light emitting element 201 and outputting the acquired temperature information to the generation unit 203 and the compensation unit 204.

Since the temperature information of the first light emitting element 201 acquired by the temperature information acquisition unit 202 is used for acquisition of temperature characteristics as compensation information of a power supply condition for driving the first light emitting element 201, and compensation for temperature characteristics of the power supply condition for driving the first light emitting element 201, it is desirable to acquire the temperature information of the first light emitting element 201 with satisfactory accuracy.

The resistance value of the first light emitting element 201 may be used as the temperature information of the first light emitting element 201. The electrically connectable light emitting element has the electrical resistance inclusive of the above-described LED, MEMS heater, incandescent lightbulb and the like. For example, when the light emitting element is of the LED, the resistance value changes due to such as a carrier density being changed according to the temperature of the element, the state of an energy band being changed, etc. Further, regardless of the light emitting element being the LED or not, the resistance value changes even by the fact that the element is thermally expanded or contracted according to the temperature of the element, etc. That is, the resistance value of the first light emitting element 201 has a direct correlation with the temperature of the first light emitting element 201. Therefore, the acquisition of the temperature characteristics as the compensation information of the power supply condition for driving the first light emitting element 201, and the compensation for the temperature characteristics of the power supply condition for driving the first light emitting element 201 can be carried out with satisfactory accuracy by using the resistance value of the first light emitting element 201 as the temperature information of the first light emitting element 201. Thus, it is preferable to use the resistance value of the first light emitting element 201 as the temperature information of the first light emitting element 201 from the viewpoint that the temperature information of the first light emitting element 201 is acquired with satisfactory accuracy.

Incidentally, as the resistance value of the first light emitting element 201, there may be used a potential difference generated in the first light emitting element 201 when a test current is input to the first light emitting element 201, or a value of a current which flows through the first light emitting element 201 when a test voltage is applied to the first light emitting element 201.

Further, a thermistor may be disposed in the vicinity of the first light emitting element 201, e.g. on the same substrate as the first light emitting element 201. The resistance value of the thermistor may be used as the temperature information of the first light emitting element 201. In this case, since the first light emitting element 201 and the thermistor are disposed on the same substrate, the temperature of the first light emitting element 201 and the temperature of the thermistor are considered to be approximately equal to each other. That is, the resistance value of the thermistor has an indirect correlation with the temperature of the first light emitting element 201. Therefore, the use of the resistance value of the thermistor as the temperature information of the first light emitting element 201 enables the acquisition of the temperature characteristics as the compensation information of the power supply condition for driving the first light emitting element 201 and the compensation for the temperature characteristics of the power supply condition for driving the first light emitting element 201 to be carried out with satisfactory accuracy.

Thus, it is preferable to use the resistance value of the thermistor disposed on the same substrate as the first light emitting element 201 as the temperature information of the first light emitting element 201 from the viewpoint that the temperature information of the first light emitting element 201 itself is acquired with satisfactory accuracy. Incidentally, as the resistance value of the thermistor, a potential difference generated in the thermistor when a test current is input to the thermistor, or a value of a current flowing through the thermistor when a test voltage is applied to the thermistor may be used.

The temperature information acquisition unit 202 is preferably, for example, a resistance measurement circuit. The resistance measurement circuit may calculate, for example, a resistance value, based on a potential difference generated in a resistance measuring object when a test current is input to the resistance measuring object, or a current flowing through the resistance measuring object when a test voltage is applied to the resistance measuring object.

Also, the temperature information acquisition unit 202 may have an analog/digital conversion circuit and output temperature information as digital data.

Further, the temperature information acquisition unit 202 may have a storage area and store the temperature information of the first light emitting element 201 in the storage area, read the temperature information from the storage area according to requests from the generation unit 203 and the compensation unit 204, and output the read temperature information therefrom.

Furthermore, the temperature information acquisition unit 202 may be incorporated in another component such as the first light emitting element 201 in the light emitting device 200.

(Generation Unit)

The generation unit 203 is not particularly limited as far as being capable of generating the compensation information from the relationship between the output equivalent value S201 of the first light emitting element 201 and the temperature information S202 output from the temperature information acquisition unit 202. The generation unit 203 generates compensation information and stores the generated compensation information in the storage unit 205. Further, when new compensation information is generated, the generation unit 203 updates the compensation information generated before being stored in the storage unit 205 with the newly-generated compensation information and stores the same therein.

The generation unit 203 is preferably, for example, an analog IC, a digital IC, and a processor such as a CPU, a microcontroller or the like.

Further, the generation unit 203 may be incorporated in another component such as the compensation unit 204 in the light emitting device 200.

(Compensation Unit)

The compensation unit 204 is not particularly limited as far as being capable of compensating the power supply condition for driving the first light emitting element 201, based on the temperature information S202 input from the temperature information acquisition unit 202 and the compensation information S203 read from the storage unit 205.

The compensation unit 204 is preferably, for example, an analog IC, a digital IC, and a processor such as a CPU, a microcontroller or the like.

Also, the compensation unit 204 may be incorporated in another component such as the generation unit 203 or the like in the light emitting device 200.

Further, the compensation unit 204 may output a power supply condition compensated for the influence of the temperature characteristics as an analog value such as a voltage value, a current value or the like, or may output the same as a digital value through a communication port or a bus.

(Storage Unit)

The storage unit 205 is not particularly limited as far as being capable of storing the compensation information S203 of the power supply condition for driving the first light emitting element 201, which is generated in the generation unit 203. The storage unit 205 may be incorporated in the generation unit 203.

(Control Unit)

The control unit 206 is not particularly limited as far as being capable of supplying required power to the first light emitting element 201 and changing the temperature state of the first light emitting element 201 by changing the power to be supplied to the first light emitting element 201 when the generation signal for instructing the generation of the compensation information is input from the instruction unit 207.

(Instruction Unit)

The instruction unit 207 is not particularly limited as far as being capable of outputting the generation signal for instructing the generation of the compensation information to the control unit 206. The instruction unit 207 outputs the generation signal to the control unit 206 by, for example, an instruction from a user to the instruction unit 207 to output the generation signal, or with an arbitrary timing such as periodically.

(Method of Compensating Influence of Temperature Characteristics)

A method of compensation (hereinafter may be called "temperature characteristic compensation") for the influence of the temperature characteristics, which is performed by the compensation unit 204 will be described using FIG. 5.

Figure 5:
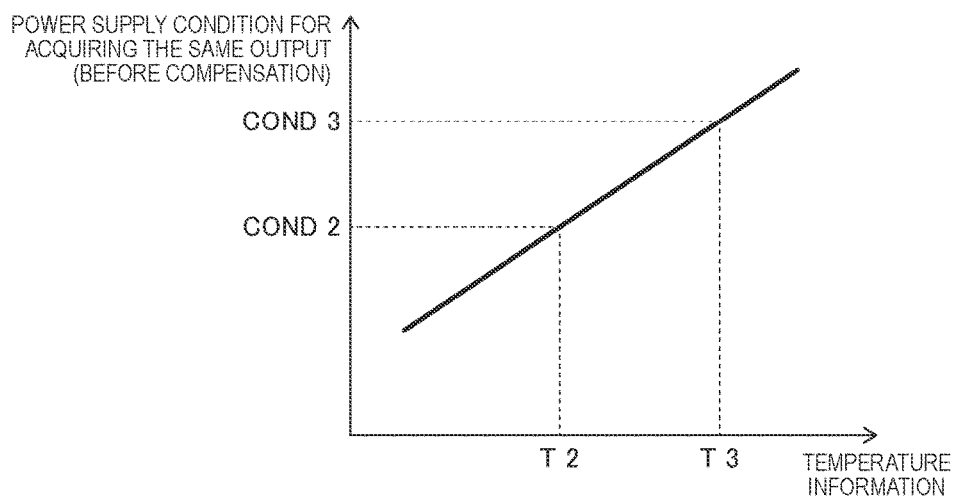
FIG. 5 is a conceptual diagram for describing a method of compensating temperature characteristics.

FIG. 5 is a conceptual diagram illustrating the temperature characteristics of power supply conditions necessary for the first light emitting element 201 and illustrates the relationship between temperature information and power supply conditions for the first light emitting element 201, for obtaining the same output in an accuracy range required for the light emitting device 200. In FIG. 5, the horizontal axis is the element temperature of the first light emitting element 201 or temperature information indicative of a value equivalent to the temperature. The vertical axis is the power supply conditions of the first light emitting element 201.

Here, the power supply conditions indicate power supply conditions including, for example, a current value adapted where the first light emitting element 201 is driven by current control, a voltage value adapted where the first light emitting element 201 is driven by voltage control in the same manner, a power value adapted where the first light emitting element 201 is driven by power control in the same manner, and the time taken to supply a current, a voltage and power without depending on a control method. Particularly when an LED is used as the first light emitting element 201, the LED is of a quantum type optical device, and its light-emission characteristics depend on the amount of supplied charges and the temperature. It is therefore desirable to control a current value and a current supply time. Further, particularly when a MEMS heater and an incandescent electric lamp are used as the first light emitting element 201, they are of a thermal-type device, and their light-emission characteristics depend on the amount of supplied power and the temperature. It is therefore desirable to control a power value and a power supply time.

Further, it is necessary that since there is a tendency that when the LED is used as the first light emitting element 201 by the current control, the output of the light emitting element is reduced in the same current supply amount when the temperature of the light emitting element is raised, the current supply amount is increased upon the rise in temperature to always obtain the same output.

As the method of compensation for the temperature characteristics, there is mentioned, for example, a method of defining a reference temperature and converting a power supply condition at a temperature outside the reference temperature to a power supply condition at the reference temperature.

As illustrated in FIG. 5, for example, when an acquired temperature information value is T3 with respect to a reference temperature information value T2 corresponding to the reference temperature, such temperature characteristics as illustrated in FIG. 5 are referred to as compensation information, and power is supplied from the control unit 206 to the first light emitting element 201 using a power supply condition COND3. Thus, it is possible to obtain the same output as one where power is supplied to the first light emitting element 201 using a power supply condition COND2 at the reference temperature information value T2.

By doing so, the light emitting device 200 is capable of outputting light compensated for the influence of the temperature characteristics.

(Acquisition of Compensation Information)

A method for acquiring the compensation information referred to when the temperature characteristics compensation is performed, i.e., the temperature characteristics of the power supply condition for driving the first light emitting element 201 will be described using FIG. 5.

When acquiring the compensation information, a change in temperature of the first light emitting element 201, which is generated by supplying power to the first light emitting element 201 to cause the first light emitting element 201 to generate heat, is utilized.

That is, a power supply condition at the time that the temperature information of the first light emitting element 201 and the output of the first light emitting element 201 turn into the state of outputting the prescribed same light, when the temperature of the first light emitting element 201 is raised by the power supply, is acquired, so that the relationship between the temperature information of the first light emitting element 201 and the power supply condition for acquiring the same output, in the state in which the temperature of the first light emitting element 201 is raised more than the environment temperature can be obtained.

Figure 6:
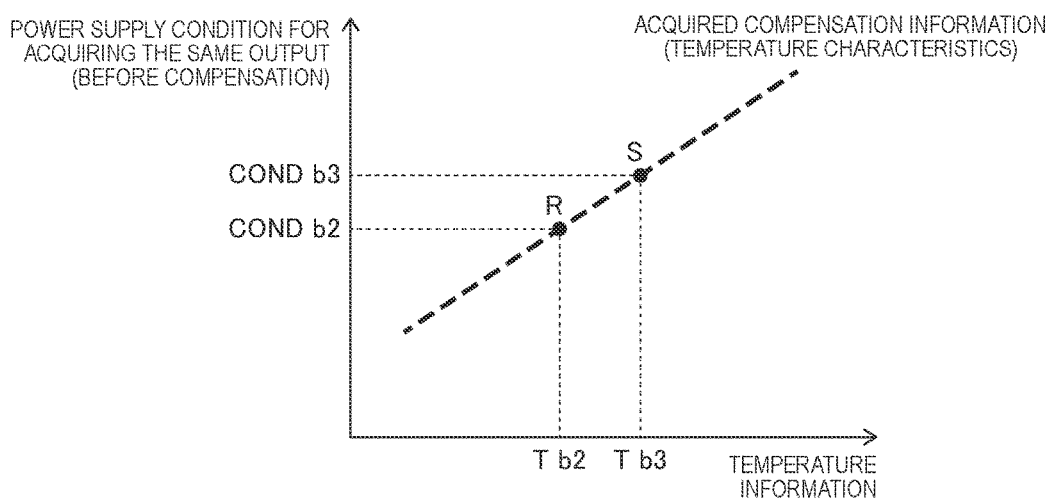
FIG. 6 is a conceptual diagram for describing a method of compensating temperature characteristics.

As illustrated in FIG. 6, for example, when a reference temperature information value Tb2 and a power supply condition CONDb2 under which the state of outputting the prescribed same light is taken at the time of Tb2 are obtained in a reference temperature environment, a point R in FIG. 6 is obtained. Further, when a temperature information value Tb3 of the first light emitting element 201 and a power supply condition CONDb3 in the state of outputting the prescribed same light at the time of Tb3 are obtained after the power is supplied to the first light emitting element 201 so that a rise in the temperature of the first light emitting element 201 is generated, a point S in FIG. 6 is obtained. At this time, a straight line passing through the points R and S can be used, as compensation information, for compensation of temperature characteristics of the power supply condition for driving the first light emitting element 201 at the subsequent compensation unit 204. Although only the two points R and S are acquired as actual measurement values in the present example, actual measurement values at more points may be used. In this case, a curve of temperature characteristics being of compensation information may be acquired as an approximate expression of an arbitrary equation by a least-squares method using actual measurement points.

Alternatively, when it is difficult to directly obtain the relationship between the temperature information of the first light emitting element 201 and the power supply condition for obtaining the same output, in the state in which the temperature of the first light emitting element 201 is raised more than the environment temperature, the temperature information of the first light emitting element 201 and the output of the first light emitting element 201 are acquired when the temperature of the first light emitting element 201 is raised by the supply of power. By doing so, the relationship between the temperature information of the first light emitting element 201 and the output of the first light emitting element 201 in the state in which the temperature of the first light emitting element 201 is raised more than the environment temperature is acquired. From this result, the relationship between the temperature information of the first light emitting element 201 and the power supply condition for obtaining the same output in the state in which the temperature of the first light emitting element 201 is raised more than the environment temperature may be acquired.

Figure 7:
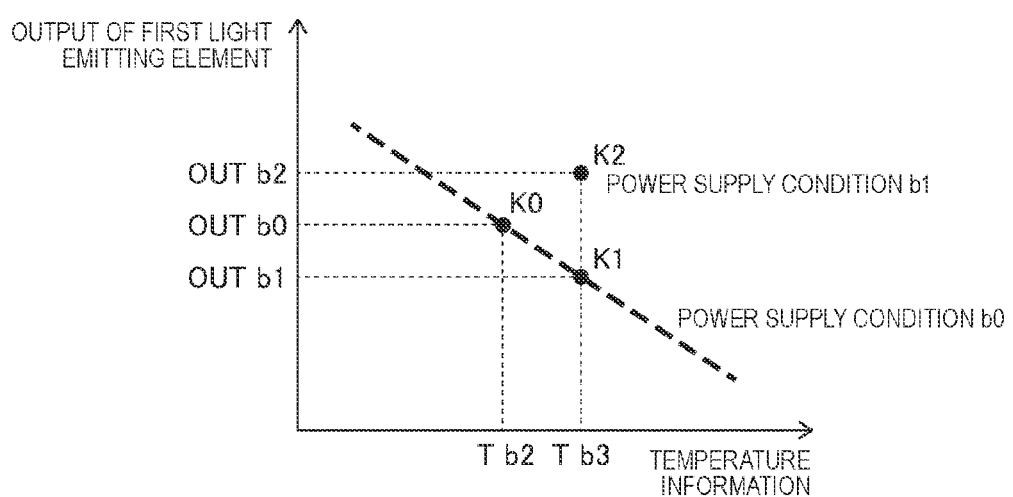
FIG. 7 is a conceptual diagram for describing a method of compensating temperature characteristics.

As illustrated in FIG. 7, for example, when an output OUTb0 of the first light emitting element 201 is obtained by driving the first light emitting element 201 in a reference temperature environment according to a reference temperature information value Tb2 and a power supply condition b0 under which the state of outputting the prescribed same light is reached at the time of Tb2, a point K0 in FIG. 7 is obtained. Further, when an output OUTb1 of the first light emitting element 201 is obtained by driving the first light emitting element 201 by a temperature information value Tb3 of the first light emitting element 201 and a power supply condition b1 at that time after power is supplied to the first light emitting element 201 so that a rise in the temperature of the first light emitting element 201 is generated, a point K1 in FIG. 7 is obtained. At this time, for example, when the relationship between the condition for the supply of power to the first light emitting element 201 and the output of the first light emitting element 201 at an arbitrary temperature is known in advance, a power supply condition at the time that the output of the first light emitting element 201 outputs the prescribed same light at a temperature information value Tb3 may be obtained from the points K0 and K1. More specifically, for example, when an LED is used as the first light emitting element 201 and current control is used as its driving method, it is expected in the LED that the amount of supplied charges and the output of light become a substantially proportional relationship. Therefore, when a given drive current value A is used as the above-described power supply condition b0, a current value being twice the drive current value A is supplied to the first light emitting element 201 of a die where the temperature information value Tb3 is obtained, assuming that when the temperature information value Tb3 is obtained, the output of the first light emitting element 201 is ½ of the output of the first light emitting element 201 at the time that the reference temperature information value Tb2 is obtained, whereby it is possible to obtain an output equal to the output of the first light emitting element 201 when the reference temperature information value Tb2 is obtained. In the present example, the power supply condition b0 corresponds to CONDb2 in FIG. 6, and the power supply condition, obtained from the points K0 and K1, under which the output of the first light emitting element 201 turns into a state of outputting the prescribed same light at the temperature information value Tb3 corresponds to CONDb3.

Further, when the relationship between the condition for the supply of power to the first light emitting element 201 and the output of the first light emitting element 201 is not known beforehand, the relationship between the condition for the supply of power to the first light emitting element 201 and the output of the first light emitting element 201 at an arbitrary temperature may be estimated by obtaining actual measurement points using a plurality of power supply conditions. More specifically, as illustrated in FIG. 7, for example, a point K2 is obtained using a power supply condition b1 different from the power supply condition b0 when the temperature information value Tb3 is obtained, whereby a power supply condition at the time that the output of the first light emitting element 201 outputs the prescribed same light at the temperature information value Tb3, i.e., a power supply condition for obtaining an output indicated by the point K0 may be acquired from the points K1 and K2.

The acquisition of these temperature characteristics may be carried out plural times according to the accuracy of compensation for the temperature characteristics to be determined, i.e., the accuracy of compensation information to be acquired.

It is desirable that since the first light emitting element 201 can actually measure only temperature characteristic in a state of a higher temperature than the environment temperature, the acquisition of the compensation information is performed on a temperature range desired to carryout the temperature characteristics compensation under a lower-temperature environment.

Further, the acquisition of the compensation information may be used together with the related art. That is, information for compensating temperature characteristics at temperatures among a plurality of environment temperatures actually controlled by the heat bath may be interpolated by performing the acquisition of such compensation information while changing the environment temperature by using the heat bath such as the thermostatic chamber, for example.

The acquisition of the compensation information may be performed at the time of a pre-shipment inspection of the light emitting device 200.

Further, the acquisition of the compensation information may be performed in the middle of the light emitting device 200 being used. In this case, it is necessary that the output of the first light emitting element 201 is acquired by the light emitting device 200 itself. Thus, there may be further provided a light receiving element for acquisition of compensation information, which receives at least part of light output from the first light emitting element 201 and outputs an output signal corresponding to the amount of the received light. The output signal may be used as the output of the first light emitting element 201 when power is supplied to the first light emitting element 201 on a plurality of power supply conditions. Incidentally, for example, a light receiving element having a functional configuration equivalent to that of the first light receiving element 101 in the light receiving device 100 can be applied as the light receiving element for the acquisition of the compensation information.

Also, the temperature information of the first light emitting element 201 and its output at the time that the temperature of the first light emitting element 201 is raised by the power supply may be acquired in the middle of the supply of power being carried out, or may be acquired after the supply of power is completed. When, however, they are acquired after the completion of the power supply, the temperature information value of the first light emitting element 201 and its output at that time are required to be acquired before the temperature raised by the power supply is lowered to the environment temperature after the completion of the power supply.

Further, the output of the first light emitting element 201 may be acquired over many points in the process that the temperature of the first light emitting element 201 is raised by the power supply, whereby the output of the first light emitting element 201 at the time that the first light emitting element 201 is in a plurality of temperature states may be acquired.

Furthermore, in order to acquire more accurate compensation information, when the temperature information value of the first light emitting element 201 after the rise in the temperature thereof by the power supply, and the output of the first light emitting element 201 at that time are acquired over many points, the temperature information value of the first light emitting element 201 and the output of the first light emitting element 201 at that time may be acquired plural times during a period until the temperature raised by the power supply is lowered to the environment temperature after the completion of the power supply.

Thus, in the light emitting device 200 according to the second embodiment of the present invention, since the light emitting device 200 is integrally equipped with the generation unit 203 therein, the temperature characteristics of the latest optical element can be obtained under the use environment or the like by operating the generation unit 203. Even when the temperature characteristics of the optical element are varied due to aging deterioration or the like, it is possible to compensate for temperature characteristics with high accuracy.

A third embodiment of the present invention will next be described.

Figure 8:
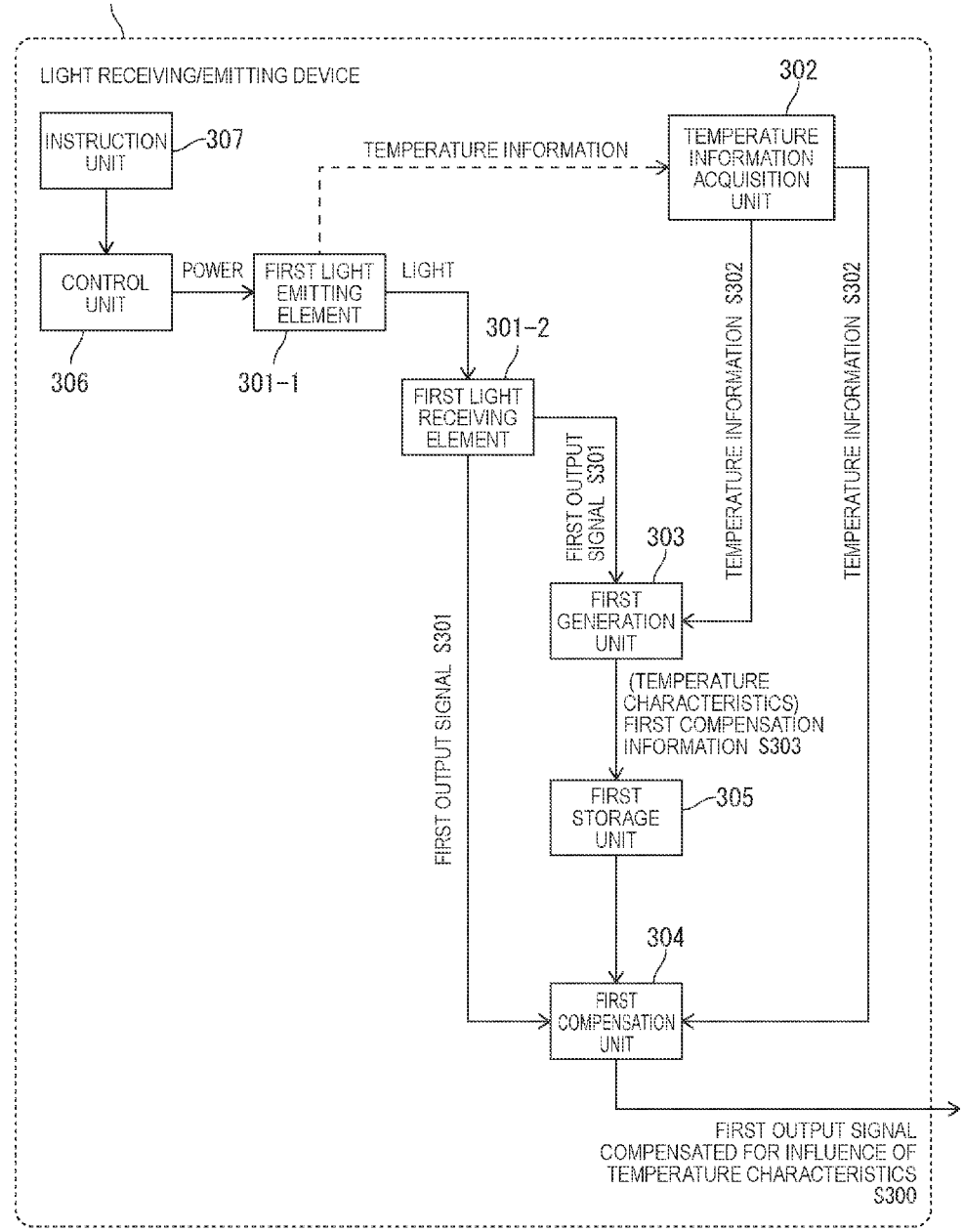
FIG. 8 is a schematic configuration diagram illustrating one example of a light receiving/emitting device according to a third embodiment of the present invention.

FIG. 8 is a schematic configuration diagram illustrating one example of a light receiving/emitting device according to one embodiment of the present invention.

<Light Receiving/Emitting Device>

A light receiving/emitting device according to one embodiment of the present invention is equipped with a first light emitting element which outputs light having an amount corresponding to power to be supplied, a first light receiving element which receives at least part of the light output from the first light emitting element and outputs a first output signal corresponding to the amount of the received light, a temperature information acquisition unit which acquires temperature information of the first light emitting element, a first storage unit which stores first compensation information used for compensation of the first output signal, a control unit which supplies power to the first light emitting element to change the first light emitting element to a plurality of temperature states, a first generation unit which generates the first compensation information, based on a plurality of the first output signals and the temperature information in the temperature states, and a first compensation unit which compensates for the first output signal, based on the temperature information and the first compensation information.

The compensation information mentioned here includes a table representing the correspondence of the temperature information of the first light emitting element and a rate of change in the output signal of the first light receiving element, or a coefficient of a function for calculating the rate of change in the output signal of the first light receiving element as an output with the temperature information as an input, or a coefficient of a function for calculating the first output signal compensated for the influence of temperature characteristics with the temperature information and the first output signal as inputs, etc.

According to the light receiving/emitting device according to the one embodiment of the present invention, it is possible to acquire temperature characteristics of the latest optical element under a use environment. Using this enables compensation for the influence of the temperature characteristics with high accuracy even when the temperature characteristics of the optical element are varied due to aging deterioration or the like. Further, since a plurality of temperature states can be generated by supplying power to the first light emitting element, it is possible to generate compensation information of the output of the first light receiving element, for compensating for the temperature characteristics based on the temperature of the first light emitting element without the need for a large-scaled facility like a heat bath such as a thermostatic chamber.

A light receiving/emitting device 300 according to the third embodiment of the present invention is equipped, as illustrated in FIG. 8, with a first light emitting element 301-1, a first light receiving element 301-2, a temperature information acquisition unit 302, a first generation unit 303, a first compensation unit 304, a first storage unit 305, a control unit 306, and an instruction unit 307.

Here, the first light emitting element 301-1 is operated in response to the supply of power from the control unit 306. The first light receiving element 301-2 receives at least part of light output from the first light emitting element 301-1. Further, the first light receiving element 301-2 outputs a first output signal S301 as its output to the first generation unit 303 and the first compensation unit 304. The temperature information acquisition unit 302 acquires temperature information of the first light emitting element 301-1 and outputs the temperature information S302 to the first generation unit 303 and the first compensation unit 304. When a generation signal for instructing the generation of compensation information is input from the instruction unit 307, the first generation unit 303 generates first compensation information S303 for compensating temperature characteristics which appear in the first output signal S301 of the first light receiving element 301-2, and stores the generated first compensation information S303 in the first storage unit 305. Further, when new first compensation information S303 is generated, the first generation unit 303 updates the first compensation information S303 generated before being stored in the first storage unit 305 with the newly-generated first compensation information S303 and stores the same therein.

The first compensation unit 304 compensates for the first output signal S301 input from the first light receiving element 301-2, based on the temperature information S302 output from the temperature information acquisition unit 302 and the first compensation information S303 stored in the first storage unit 305 and outputs a first output signal compensated for the influence of the temperature characteristics, i.e., an output signal S300 indicative of an amount of received light.

The control unit 306 supplies required power to the first light emitting element 301-1. When the generation signal for instructing the generation of the compensation information is input from the instruction unit 307, the control unit 306 changes the power supplied to the first light emitting element 301-1 to change the first light emitting element 301-1 to a plurality of temperature states.

(First Light Emitting Element)

The first light emitting element 301-1 is not particularly limited as far as being capable of outputting light having a wavelength to be output by the light receiving/emitting device 300, which has an amount of light corresponding to supplied power.

Further, the first light emitting element 301-1 has a functional configuration equivalent to that of the first light emitting element 201 of the light emitting device 200 according to the second embodiment of the present invention.

(First Light Receiving Element)

The first light receiving element 301-2 is not particularly limited as far as being capable of, when it receives light having a wavelength to be indicative of sensitivity by the light receiving/emitting device 300 and receives at least part of the light output from the first light emitting element 301-1, electrically outputting a first output signal S301 corresponding to the amount of the received light.

The first light receiving element 301-2 has a functional configuration equivalent to that of the first light receiving element 101 of the light receiving device 100 according to the first embodiment of the present invention.

(Temperature Information Acquisition Unit)

The temperature information acquisition unit 302 is not particularly limited as far as being capable of acquiring temperature information of the first light emitting element 301-1 and outputting the temperature information to the first generation unit 303 and the first compensation unit 304.

The temperature information acquisition unit 302 has a functional configuration equivalent to that of the temperature information acquisition unit 202 of the light emitting device 200 according to the second embodiment of the present invention. Incidentally, the resistance value of the first light emitting element 301-1 may be used as the temperature information of the first light emitting element 301-1 as with the light emitting device 200. Further, as with the light emitting device 200, a thermistor may be disposed in the vicinity of the first light emitting element 301-1, e.g. on the same substrate, and the resistance value of the thermistor may be used as the temperature information of the first light emitting element 301-1.

(First Generation Unit)

The first generation unit 303 is not particularly limited as far as being capable of generating the first compensation information S303 from the relationship between the first output signal S301 output from the first light receiving element 301-2 and the temperature information S302 output from the temperature information acquisition unit 302.

The first generation unit 303 has a functional configuration equivalent to that of the generation unit 103 of the light receiving device 100 according to the first embodiment of the present invention.

(First Compensation Unit)

The first compensation unit 304 is not particularly limited as far as being capable of compensating the first output signal S301 output from the first light receiving element 301-2, based on the temperature information S302 input from the temperature information acquisition unit 302 when the first output signal S301 is obtained, and the first compensation information S303 read from the first storage unit 305 and outputting an output signal compensated for the influence of temperature characteristics, i.e., a first output signal S300 of the light receiving/emitting device 300.

The first compensation unit 304 has a functional configuration equivalent to that of the compensation unit 104 of the light receiving device 100 according to the first embodiment of the present invention.

(First Storage Unit)

The first storage unit 305 is not particularly limited as far as being capable of storing the first compensation information S303 of the first output signal S301 generated in the first generation unit 303. The first storage unit 305 may be incorporated in the first generation unit 303.

(Control Unit)

The control unit 306 is not particularly limited as far as being capable of supplying required power to the first light emitting element 301-1 and changing the temperature state of the first light emitting element 301-1 by changing the power to be supplied to the first light emitting element 301-1 when the generation signal for instructing the generation of the compensation information is input from the instruction unit 307.

(Instruction Unit)

The instruction unit 307 is not particularly limited as far as being capable of outputting the generation signal for instructing the generation of the compensation information to the control unit 306. The instruction unit 307 outputs the generation signal to the control unit 306 by, for example, an instruction from a user to the instruction unit 307 to output the generation signal, or with an arbitrary timing such as periodically.

(Method of Compensating Influence of Temperature Characteristics)

In the light receiving/emitting device 300, when the influence of the temperature characteristics of the first light emitting element 301-1 is taken into consideration, the first output signal S301 of the first light receiving element 301-2 which receives at least part of the light output from the first light emitting element 301-1 also has temperature characteristics since the light has temperature characteristics. Thus, the first output signal S300 compensated for the influence of the temperature characteristics of the first light emitting element 301-1 can be obtained by compensating the first output signal S301, based on the temperature information of the first light emitting element 301-1.

The compensation for the temperature characteristics of the first output signal S301 in the light receiving/emitting device 300 can be carried out using the first compensation information S303 in a manner similar to the compensation for the temperature characteristics of the light receiving device 100 according to the first embodiment of the present invention. The temperature characteristics temperature-compensated in the light receiving/emitting device 300 are however caused by the temperature characteristics of the first light emitting element 301-1.

Further, when the temperature characteristics exist even in the first light receiving element 301-2 itself, the influence of the temperature characteristics of the first light receiving element 301-2 is also required to be compensated according to the accuracy to be required in the light receiving/emitting device 300. It is however apparent that about this, the method of compensating the influence of the temperature characteristics of the first light receiving element 101 in the light receiving device 100 according to the first embodiment of the present invention can be used.

(Acquisition of First Compensation Information)

The acquisition of the first compensation information S303 referred to when performing the compensation for the temperature characteristics which appear in the first output signal S301, i.e., the temperature characteristics of the first output signal S301 being the output of the first light receiving element 301-2 can be performed as with the light receiving device 100 according to the first embodiment of the present invention. However, a change in the temperature occurs in the first light emitting element 301-1 by power-on.

Thus, since the light receiving/emitting device 300 according to the third embodiment of the present invention is integrally equipped with the first generation unit 303 therein, the temperature characteristics of the latest optical element can be acquired under the use environment or the like. Even when the temperature characteristics of the optical element are varied due to the aging deterioration or the like, the temperature characteristics can be compensated highly accurately. Further, the influence of the temperature characteristics of the first light emitting element 301-1 and the influence of the temperature characteristics of the first light receiving element 301-2 can be compensated together.

A fourth embodiment of the present invention will next be described.

Figure 9:
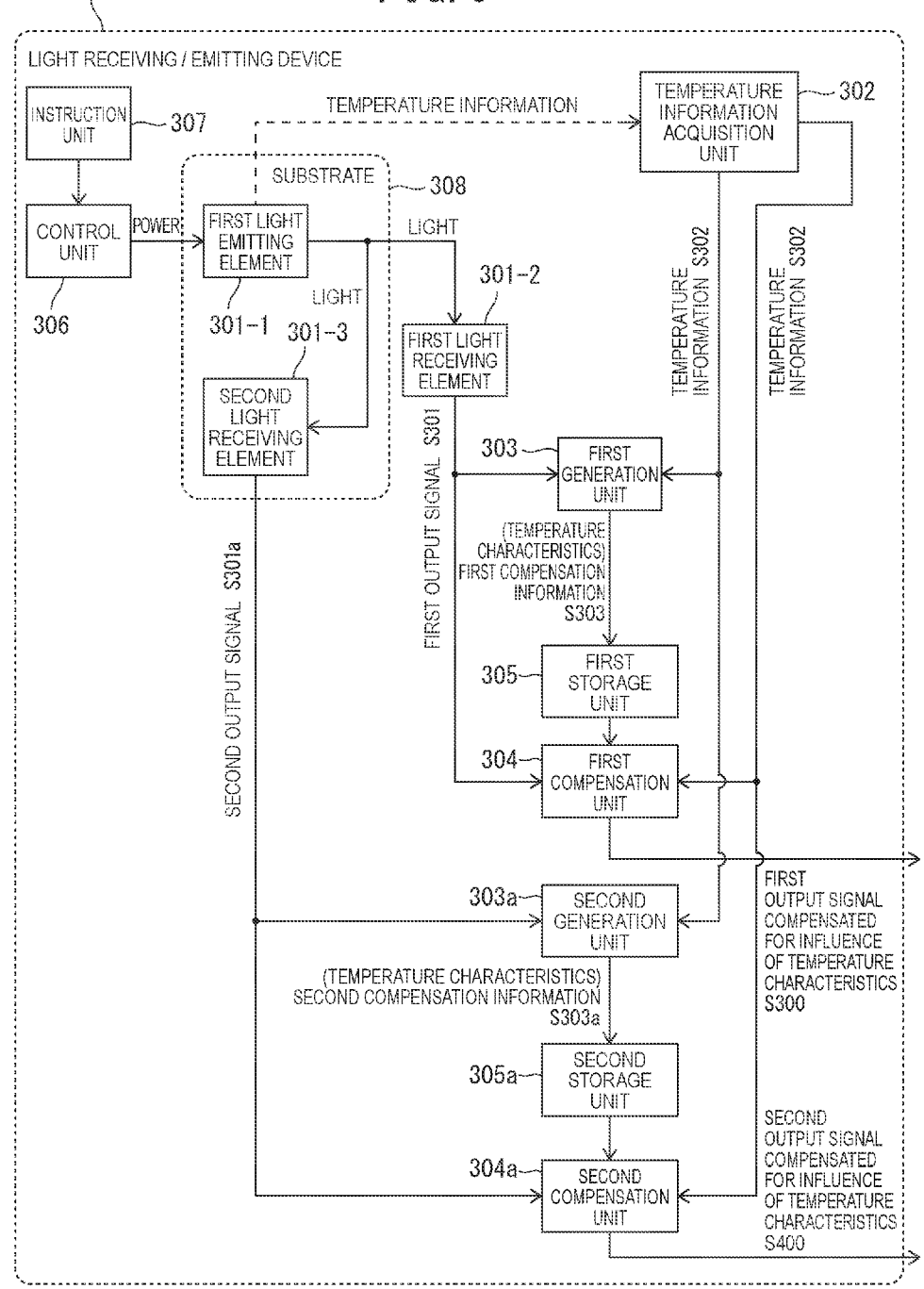
FIG. 9 is a schematic configuration diagram illustrating a modification of a light receiving/emitting device according to a fourth embodiment of the present invention.

FIG. 9 is a schematic configuration diagram illustrating a modification of a light receiving/emitting device according to one embodiment of the present invention.

<Modification of Light Receiving/Emitting Device>

The light receiving/emitting device according to the fourth embodiment of the present invention is further equipped with, in addition to the light receiving/emitting device according to the third embodiment, a second light receiving element which is disposed on the same substrate as the first light emitting element and which receives at least part of light output from the first light emitting element and outputs a second output signal corresponding to an amount of received light, a second generation unit which calculates second compensation information being compensation information of a second output signal, based on a plurality of the second output signals and temperature information at the time that power is supplied to the first light emitting element on a plurality of power supply conditions, a second compensation unit which compensates the second output signal, based on the temperature information and the second compensation information at the time that the second output signal is obtained, and a second storage unit which stores the second compensation information therein.

The substrate mentioned here includes a printed board mounted with respective parts such as elements, and a semiconductor substrate. Further, when the second light receiving element is disposed on the same printed board as the first light emitting element, the second light receiving element is preferably disposed at a position closer to the first light emitting element than the first light receiving element. By doing so, it is possible to obtain a second output signal S400 which suffers little influence of external disturbances other than the temperature characteristics caused by the first light emitting element 301-1, as compared with the first output signal S300.

As illustrated in FIG. 9, a light receiving/emitting device 400 according to the fourth embodiment of the present invention is further equipped with a second light receiving element 301-3, a second generation unit 303a, a second compensation unit 304a, and a second storage unit 305a in the light receiving/emitting device 300 according to the third embodiment.

Here, the second light receiving element 301-3 receives at least part of light output from the first light emitting element 301-1. Further, the second light receiving element 301-3 outputs a second output signal S301a being its output to the second generation unit 303a and the second compensation unit 304a.

The temperature information acquisition unit 302 acquires temperature information of the first light emitting element 301-1 and outputs the acquired temperature information S302 to the second generation unit 303a and the second compensation unit 304a.

When a generation signal for instructing the generation of compensation information is input from the instruction unit 307, the second generation unit 303a calculates second compensation information S303a for compensating temperature characteristics which appear in the second output signal S301a of the second light receiving element 301-3, based on the second output signal S301a and the temperature information S302, and stores the second compensation information S303a in the second storage unit 305a. The second compensation unit 304a compensates the second output signal S301a input from the second light receiving element 301-3, based on the temperature information S302 output from the temperature information acquisition unit 302 and the second compensation information S303a stored in the second storage unit 305a, and outputs a second output signal S400 compensated for the influence of the temperature characteristics. Incidentally, the second storage unit 305a may be common to the first storage unit 305.

Further, the control unit 306 supplies required power to the first light emitting element 301-1. When a generation signal for instructing the generation of the first compensation information S303 and/or the second compensation information S303a is input from the instruction unit 307, the control unit 306 changes the power supplied to the first light emitting element 301-1 to change the first light emitting element 301-1 to a plurality of temperature states for generating the first compensation information S303 and/or a plurality of temperature states for generating the second compensation information S303a. Incidentally, the plurality of temperature states for the generation of the first compensation information S303 and the generation of the second compensation information S303a may be common or may be provided individually. Further, the power to be supplied to the first light emitting element 301-1 may be changed depending on whether the generation of either of the first compensation information S303 and the second compensation information S303a is instructed.

The instruction unit 307 is not particularly limited as far as being capable of outputting the generation signal for instructing the generation of the first compensation information S303 or the second compensation information S303a to the control unit 306. The instruction unit 307 outputs the generation signal to the control unit 306 by, for example, an instruction from a user to the instruction unit 307 to output the generation signal, or with an arbitrary timing such as periodically. The generation signal for instructing the generation of the first compensation information S303 and the generation signal for instructing the generation of the second compensation information S303a may be common. Further, the generation signal may be provided for each of the first compensation information and the second compensation information.

Since the first output signal S300 compensated for the influence of the temperature characteristics is less affected by external disturbances, the second output signal S400 compensated for the influence of the temperature characteristics can be used for the calculation of a variation amount due to factors other than the temperature characteristics, excepting a variation in the first output signal S300 compensated for the influence of the temperature characteristics, which does not depend on the temperature of the output of the first light emitting element 301-1.

(Second Light Receiving Element)

The second light receiving element 301-3 is not particularly limited as far as being capable of being formed on the same substrate 308 together with the first light emitting element 301-1, receiving at least part of light output from the light emitting element 301-1 by propagation in the substrate 308 or reflection of the surface of the substrate 308 or the like, and outputting the second output signal S301a corresponding to the amount of the received light.

As the second light receiving element 301-3, there can be used one having a functional configuration equivalent to that of the first light receiving element 301-2.

(Second Generation Unit)

The second generation unit 303a is not particularly limited as far as being capable of generating the second compensation information S303a from the relationship between the second output signal S301a output from the second light receiving element 301-3 and the temperature information S302 output from the temperature information acquisition unit 302.

As the second generation unit 303a, there can be used one having a functional configuration equivalent to that of the first generation unit 303. Further, the second generation unit 303a may be incorporated in the first generation unit 303.

(Second Compensation Unit)

The second compensation unit 304a is not particularly limited as far as being capable of compensating the second output signal S301a output from the second light receiving element 301-3, based on the temperature information S302 output from the temperature information acquisition unit 302 and the second compensation information S303a output from the second generation unit 303a when the second output signal S301a is acquired, and outputting the second output signal S400 compensated for the influence of the temperature characteristics.

As the second compensation unit 304a, there can be used one having a functional configuration equivalent to that of the first compensation unit 304. Further, the second compensation unit 304a may be incorporated in the first compensation unit 304.

(Second Storage Unit)

The second storage unit 305a is not particularly limited as far as being capable of storing the second compensation information S303a of the second output signal S301a generated in the second generation unit 303a.

(Method of Compensating Influence of Temperature Characteristics)

In the light receiving/emitting device 400, when the influence of the temperature characteristics of the first light emitting element 301-1 is taken into consideration, the second output signal S301a of the second light receiving element 301-3 which receives at least part of the light output from the first light emitting element 301-1 also has temperature characteristics in a manner similar to the first output signal S301 since the light has the temperature characteristics. Thus, the second output signal S400 compensated for the influence of the temperature characteristics of the first light emitting element 301-1 can be obtained by compensating the second output signal S301a, based on the temperature information S302 of the first light emitting element 301-1 as with the first output signal S301.

The compensation for the temperature characteristics of the second output signal S301a in the second compensation unit 304a can be carried out using the second compensation information S303a in a procedure similar to the compensation of the temperature characteristics of the first output signal S301 of the light receiving/emitting device 300 according to the third embodiment of the present invention.
(Acquisition of Second Compensation Information)

The acquisition of the temperature characteristics of the second compensation information S303a referred to when the compensation for the temperature characteristics which appear in the second output signal S301a, i.e., the second output signal S301a being the output signal of the second light receiving element 301-3 can be carried out in a procedure similar to the acquisition of the first compensation information S303.
(Temperature Information)

In the light receiving/emitting device 400, the temperature information acquisition unit 302 may use the resistance value of the second light receiving element 301-3 as the temperature information of the first light emitting element 301-1. In this case, since the first light emitting element 301-1 and the second light receiving element 301-3 are formed on the same substrate, the temperature of the first light emitting element 301-1 and the temperature of the second light receiving element 301-3 are considered to be substantially equal. That is, since the temperature of the second light receiving element 301-3 has an indirect correlation with the temperature of the first light emitting element 301-1, the compensation for the influence of the temperature characteristics of the first light emitting element 301-1, which appear in the first output signal S301 and the second output signal S301a can be performed with satisfactory accuracy by using the resistance value of the second light receiving element 301-3 as the temperature information of the first light emitting element 301-1. Thus, it is preferable to use the resistance value of the second light receiving element 301-3 formed on the same substrate as the first light emitting element 301-1 as the temperature information of the first light emitting element 301-1 from the viewpoint that the temperature information of the first light emitting element 301-1 itself is acquired with satisfactory accuracy. Incidentally, as the resistance value of the second light receiving element 301-3, a potential difference generated in the second light receiving element 301-3 when a test current is input to the second light receiving element 301-3, or a value of a current flowing through the second light receiving element 301-3 when a test voltage is applied to the second light receiving element 301-3 may be used.

Further, in the light receiving/emitting device 400, the temperature information acquisition unit 302 may use the resistance value of a thermistor formed on the same substrate as the first light emitting element 301-1 and the second light receiving element 301-3 as with the light receiving device 100 according to the first embodiment or the light emitting device 200 according to the second embodiment.
(Correction of First Output Signal by Second Output Signal)

The first output signal (hereinafter called a "temperature-characteristics compensated first output signal") S300 and the second output signal (hereinafter called a "temperature-characteristics compensated second output signal") S400 both compensated for the influence of the temperature characteristics of the first light emitting element 301-1 can be acquired by the above method.

At this time, the temperature-characteristics compensated first output signal S300 may be corrected based on the temperature-characteristics compensated second output signal S400.

That is, since the temperature-characteristics compensated second output signal S400 is less affected by external disturbances other than the temperature characteristics as compared with the temperature-characteristics compensated first output signal S300, the second output signal S400 can be used for the calculation of a variation amount due to factors other than the temperature characteristics, excepting a variation in the temperature-characteristics compensated first output signal S300, which does not depend on the temperature of the output of the first light emitting element 301-1.

Here, the variation amount due to the factors other than the temperature characteristics, excepting the variation independent on the temperature of the output of the first light emitting element 301-1 corresponds to a change in a signal due to the interference of an object to be measured where the light receiving/emitting device 400 is used in applications of measuring instruments, for example.

Further, as the method of correcting the temperature-characteristics compensated first output signal S300, based on the temperature-characteristics compensated second output signal S400, there is mentioned, for example, a method of correcting the same based on a difference between the two, or a method of correcting the same based on a ratio between the two.

Thus, since the light receiving/emitting device 400 according to the fourth embodiment of the present invention is integrally equipped with the first generation unit 303 therein, the temperature characteristics of the latest optical element can be acquired under a use environment or the like. Even when the temperature characteristics of the optical element are varied due to aging deterioration or the like, the temperature characteristics can be compensated highly accurately. Further, the variation amount due to factors other than the temperature characteristics, excepting the first output signal S300 compensated for the influence of the temperature characteristics of the first light emitting element 301-1 and the variation in the first output signal S300, which does not depend on the temperature of the output of the first light emitting element 301-1 can be calculated.

Incidentally, in the above embodiment, when the temperature states of the first light receiving element 101 and the light emitting elements 201 and 301-1 are varied, the temperature state of the light receiving element or the light emitting element may be changed by such as continuously enhancing the temperature state by, for example, changing an amount of power to be supplied to the light receiving element or the light emitting element to an amount of power by which a desired temperature state can be reached or by supplying a constant amount of power to the light receiving element or the light emitting element.

Further, although each of the above embodiments has described the case where the acquisition of the compensation information is performed by causing the control unit to change the power to be supplied to the light emitting element or the light receiving element in response to the generation signal from the instruction unit, the above embodiment is not limited to this. For example, each generation unit may be automatically or manually operated when carrying out the acquisition of the compensation information. For example, when the generation unit 103 is automatically operated in the light receiving device 100 according to the first embodiment, for example, the generation unit 103 may execute processing for automatically acquiring the compensation information in a prescribed cycle upon startup of the light receiving device 100 or after startup of the light receiving device 100 to change the power to be supplied to the first light receiving element 101 in accordance with a control signal from the generation unit 103, and to collect various information and calculate compensation information, based on the collected information. When the generation unit is manually operated, for example, a switch or the like for causing the generation unit 103 to execute processing for acquiring compensation information may be provided, and the generation unit 103 may execute the processing for acquiring the compensation information when a switch operation is performed. The light emitting device 200, and the light receiving/emitting devices 300 and 400 according to other embodiments may be configured similarly.

Further, as a light emitting device and a light receiving device of an optical physical amount measuring apparatus which uses the light emitting device and the light receiving device and measures the concentration of a substance to be measured using an output signal of the light receiving device, the light receiving/emitting device 300 according to the above third embodiment or the light receiving/emitting device 400 according to the above fourth embodiment can also be applied. Thus, an optical physical amount measuring apparatus which suffers less influence of a temperature environment can be configured by configuring the optical physical amount measuring apparatus equipped with the light receiving/emitting device 300 or the light receiving/emitting device 400. That is, an optical physical amount measuring apparatus higher in measurement accuracy can be obtained.

Although the embodiments of the present invention have been described above, the above embodiments are intended to illustrate a device and method for embodying the technical idea of the present invention. The technical idea of the present invention is not intended to identify the material, shape, structure, arrangement, etc. of the components. The technical idea of the present invention can be modified in various ways within the technical scope defined by claims described in claims.

REFERENCE SYMBOL LIST

100 Light receiving device
101, 301-2 First light receiving element
102, 202, 302 Temperature information acquisition unit
103, 203 Generation unit
104, 204 Compensation unit
105, 205 Storage unit
106, 206, 306 Control unit
107, 207, 307 Instruction unit
200 Light emitting device
201, 301-1 First light emitting element
301-3 Second light receiving element
303 First generation unit
303a Second generation unit
304 First compensation unit
304a Second compensation unit
305 First storage unit
305a Second storage unit

What is claimed is:

1. A light receiving device comprising:
a first light receiving element configured to output a first output signal corresponding to an amount of received light;
a temperature information acquisition unit configured to acquire temperature information of the first light receiving element;
a storage unit configured to store compensation information used for compensation of the first output signal;
a control unit configured to supply power to the first light receiving element to change the first light receiving element to a plurality of temperature states;
a generation unit configured to generate the compensation information, based on a plurality of the first output signals and the temperature information in the plurality of temperature states; and
a compensation unit configured to compensate the first output signal, based on the temperature information and the compensation information.

2. The light receiving device according to claim 1, further comprising an instruction unit configured to output a generation signal for instructing the generation of the compensation information,
wherein when the generation signal is input, the control unit supplies power to the first light receiving element to change the first light receiving element to the plurality of temperature states.

3. The light receiving device according to claim 1, further comprising a compensating light emitting element,
wherein the first light receiving element receives at least part of light output from the compensating light emitting element,
wherein the compensating light emitting element is driven in a prescribed condition when the first light receiving element is in the plurality of temperature states, and
wherein the first output signal includes an output corresponding to a received amount of the light output from the compensating light emitting element.

4. The light receiving device according to claim 1, further comprising a compensating light receiving element configured to output a second output signal corresponding to an amount of received light,
wherein when an amount of change in the second output signal is less than or equal to a prescribed threshold value, the generation unit generates the compensation information.

5. The light receiving device according to claim 1, wherein the temperature information acquisition unit acquires a resistance value of the first light receiving element as the temperature information.

6. A light emitting device comprising:
a first light emitting element configured to output light having an amount corresponding to supplied power;
a temperature information acquisition unit configured to acquire temperature information of the first light emitting element;
a storage unit configured to store compensation information used for compensation of a power supply condition of the first light emitting element;
a control unit configured to supply power to the first light emitting element to change the first light emitting element to a plurality of temperature states;
a generation unit configured to generate the compensation information, based on a plurality of outputs of the first light emitting element and the temperature information in the plurality of temperature states; and a compensation unit configured to compensate the power supply condition, based on the temperature information and the compensation information.

7. The light emitting device according to claim 6, further comprising an instruction unit configured to output a generation signal for instructing the generation of the compensation information,
wherein when the generation signal is input, the control unit supplies power to the first light emitting element to change the first light emitting element to the plurality of temperature states.

8. The light emitting device according to claim 6, further comprising a compensating light receiving element configured to receive at least part of light output from the first light emitting element and output a first output signal corresponding to an amount of received light,
wherein the output signal of the compensating light receiving element is used as the output of the first light emitting element.

9. The light emitting device according to claim 6, wherein the temperature information acquisition unit acquires a resistance value of the first light emitting element as the temperature information.

10. A light receiving/emitting device comprising:
a first light emitting element configured to output light having an amount corresponding to supplied power;
a first light receiving element configured to receive at least part of the light output from the first light emitting element and output a first output signal corresponding to an amount of received light;
a temperature information acquisition unit configured to acquire temperature information of the first light emitting element;
a first storage unit configured to store first compensation information used for compensation of the first output signal;
a control unit configured to supply power to the first light emitting element to change the first light emitting element to a plurality of temperature states;
a first generation unit configured to generate the first compensation information, based on a plurality of the first output signals and the temperature information in the plurality of temperature states; and
a first compensation unit configured to compensate the first output signal, based on the temperature information and the first compensation information.

11. The light receiving/emitting device according to claim 10, further comprising an instruction unit configured to output a generation signal for instructing the generation of the first compensation information,
wherein when the generation signal is input, the control unit supplies power to the first light emitting element to change the first light emitting element to a plurality of temperature states.

12. The light receiving/emitting device according to claim 10, further comprising:
a second light receiving element disposed on the same substrate as the first light emitting element and configured to receive at least part of the light output from the first light emitting element and to output a second output signal corresponding to an amount of received light;
a second storage unit configured to store second compensation information used for compensation of the second output signal;
a second generation unit configured to generate the second compensation information, based on a plurality of the second output signals and the temperature information in the plurality of temperature states; and
a second compensation unit configured to compensate the second output signal, based on the temperature information and the second compensation information.

13. The light receiving/emitting device according to claim 12, further comprising an instruction unit configured to output a generation signal for instructing the generation of the first compensation information and/or the second compensation information,
wherein when the generation signal is input, the control unit supplies power to the first light emitting element to change the first light emitting element to a plurality of temperature states.

14. The light receiving/emitting device according to claim 10, wherein the temperature information acquisition unit acquires a resistance value of the first light emitting element as the temperature information.

15. The light receiving/emitting device according to claim 12, wherein the temperature information acquisition unit acquires a resistance value of the second light receiving element as the temperature information.

16. The light receiving/emitting device according to claim 12, wherein the first output signal is corrected based on the second output signal.

* * * * *